United States Patent
Albouyeh et al.

(10) Patent No.: US 10,432,561 B2
(45) Date of Patent: Oct. 1, 2019

(54) PROXIMITY-BASED COMMUNICATION

(71) Applicant: International Business Machines Corporation, Armonk, NY (US)

(72) Inventors: Shadi E. Albouyeh, Raleigh, NC (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 15/241,295

(22) Filed: Aug. 19, 2016

(65) Prior Publication Data

US 2018/0054406 A1    Feb. 22, 2018

(51) Int. Cl.
| | |
|---|---|
| H04L 12/58 | (2006.01) |
| H04W 4/02 | (2018.01) |
| H04M 3/436 | (2006.01) |
| H04L 29/08 | (2006.01) |
| H04M 3/42 | (2006.01) |

(52) U.S. Cl.
CPC .............. H04L 51/12 (2013.01); H04L 51/20 (2013.01); H04L 67/306 (2013.01); H04M 3/436 (2013.01); H04W 4/023 (2013.01); H04M 3/42382 (2013.01); H04M 2203/2094 (2013.01); H04M 2203/655 (2013.01); H04M 2242/22 (2013.01); H04M 2242/24 (2013.01)

(58) Field of Classification Search
CPC ...... H04L 51/12; H04L 67/306; H04M 3/436; H04W 4/023
See application file for complete search history.

(56) References Cited

U.S. PATENT DOCUMENTS

| | | | |
|---|---|---|---|
| 7,823,073 B2 | 10/2010 | Holmes et al. |
| 8,352,546 B1 | 1/2013 | Dollard |
| 8,593,277 B2 | 11/2013 | Nath et al. |
| 8,719,368 B2 | 5/2014 | Tseng |
| 2002/0016171 A1 | 2/2002 | Doganata et al. |
| 2005/0063528 A1 | 3/2005 | Pearson et al. |

(Continued)

FOREIGN PATENT DOCUMENTS

EP    1 463 269 A2    9/2004

OTHER PUBLICATIONS

Kupper et al., "Efficient Proximity and Separation Detection among Mobile Targets for Supporting Location-based Community Services", ACM 2006, 12 pages.

(Continued)

*Primary Examiner* — Awet Haile
(74) *Attorney, Agent, or Firm* — Maeve M. Carpenter; Hunter E. Webb; Keohane & D'Alessandro PLLC (57) ABSTRACT

Approaches presented herein enable determining whether to allow a communication to a recipient using a communication device based on one or more classifications of nearby individuals. Specifically, location awareness technology is leveraged to identify individuals near an intended recipient of a communication. Through review and analysis of information related to the individuals gathered from social networking outlets (e.g., Facebook, LinkedIn, etc.) and/or gathered from the recipient's communication device, a classification is assigned to each individual. Based on the classifications, a determination is made as to whether the intended communication mode is to be allowed.

18 Claims, 5 Drawing Sheets

(56) References Cited

U.S. PATENT DOCUMENTS

| | | |
|---|---|---|
| 2005/0130634 A1 | 6/2005 | Godfrey |
| 2006/0046709 A1 | 3/2006 | Krumm et al. |
| 2007/0266097 A1* | 11/2007 | Harik .................... G06Q 30/02 709/204 |
| 2010/0029302 A1 | 2/2010 | Lee et al. |
| 2013/0150004 A1* | 6/2013 | Rosen .................... H04W 8/22 455/414.1 |
| 2014/0065997 A1* | 3/2014 | Walker .................... H04W 4/90 455/404.1 |
| 2017/0353836 A1* | 12/2017 | Gordon ............... G06F 3/04817 |
| 2018/0041635 A1* | 2/2018 | Li ......................... H04W 68/04 |
| 2018/0041883 A1* | 2/2018 | Choi ....................... H04W 4/21 |

OTHER PUBLICATIONS

Stu Robarts, Mobile Technology "SocialRadar app tells you about the people around you", http://www.gizmag.com/socialradar-app/30663/, Mar. 17, 2014, 7 pages.

John Krumm et al., "The NearMe Wireless Proximity Server", UbiComp 2004, Sixth International Conference on Ubiquitous Computing, pp. 283-300, Sep. 7-10, 2004, Nottingham, England, 18 pages.

* cited by examiner

| Classification | Incoming Communication Mode | Allow or Disallow |
|---|---|---|
| Friend | Phone Call | Allow |
| Friend | Text Message | Allow |
| Family | Phone Call | Allow |
| Family | Text Message | Allow |
| Company Manager | Phone Call | Disallow |
| Company Manager | Text Message | Allow |
| Company Officer | Phone Call | Disallow |
| Company Officer | Text Message | Disallow |

PROXIMITY-BASED COMMUNICATION

TECHNICAL FIELD

This invention relates generally to proximity-based communication and, more specifically, to determining whether to allow a communication to a recipient using a communication device based on one or more classifications of nearby individuals.

BACKGROUND

The advent of social networking, instant messaging, and ubiquitous wireless data networks allows individuals to select from a plurality of methods to communicate with their contacts. In the past, communications between individuals were limited to physical mail, wired telephones, fax, and wireless telephones. However, with the expansion of the Internet, coupled with mobile devices capable of maintaining a data connection to the Internet, users may select from a plethora of communications means, such as: cellular phone calls, email to multiple accounts, multiple instant messaging protocols, twitter messages, video chats, Short Messaging Service (SMS) and Multimedia Messaging Service (MMS) messages, social networking messages, voicemail, and the like. Typically, users are less concerned by the actual communication mode used with their contacts, and more concerned with the content of the communication conveyed.

SUMMARY

In general, embodiments of the present invention provide for determining whether to allow a communication to a recipient using a communication device based on one or more classifications of nearby individuals. Specifically, location awareness technology is leveraged to identify individuals proximate to an intended recipient of a communication. Through review and analysis of information related to the individuals gathered from social networking outlets (e.g., Facebook®, LinkedIn®, etc.) and/or gathered from the recipient's communication device, a classification is assigned to each individual. Based on the classifications, a determination is made as to whether the intended communication mode is to be allowed.

One aspect of the present invention includes a computer-implemented method for proximity-based communication, comprising: detecting an incoming communication via a first mode of communication from a caller/sender at a communication device of an intended recipient at a first time; identifying one or more individuals in proximity to the communication device of the intended recipient; assigning a classification to each of the one or more individuals; determining, based on the classification of each of the one or more individuals, whether to allow the first mode of communication; and responsive to determining the first mode of communication is not allowed, canceling transmission of the communication.

Another aspect of the present invention includes a computer system for proximity-based communication, the computer system comprising: a memory medium comprising program instructions; a bus coupled to the memory medium; and a processor for executing the program instructions, the instructions causing the system to: detect an incoming communication via a first mode of communication from a caller/sender at a communication device of an intended recipient at a first time; identify one or more individuals in proximity to the communication device of the intended recipient; assign a classification to each of the one or more individuals; determine, based on the classification of each of the one or more individuals, whether to allow the first mode of communication; and cancel transmission of the communication when the first mode of communication is not allowed.

Yet another aspect of the present invention includes a computer program product for proximity-based communication, and program instructions stored on the computer readable storage device, to: detect an incoming communication via a first mode of communication from a caller/sender at a communication device of an intended recipient at a first time; identify one or more individuals in proximity to the communication device of the intended recipient; assign a classification to each of the one or more individuals; determine, based on the classification of each of the one or more individuals, whether to allow the first mode of communication; and cancel transmission of the communication when the first mode of communication is not allowed.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as being limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments of the present invention provide for determining whether to allow a communication to a recipient using a communication device based on one or more classifications of nearby individuals. Specifically, location awareness technology is leveraged to identify individuals near an intended recipient of a communication. Through review and analysis of information related to the individuals gathered from social networking outlets (e.g., Facebook®, LinkedIn®, etc.) and/or gathered from the recipient's communication device, a classification is assigned to each individual. Based on the classifications, a determination is made as to whether the intended communication mode is to be allowed.

The inventors of the invention described herein have recognized certain deficiencies in known methods for communicating with others via communication devices. The proximity of others may influence a recipient's ability to respond to a communication from another person via a particular communication mode (phone call, text message, etc.). For example, a son may not be able answer a phone call from his mother if he is sitting at his desk at work and engaged in a conversation with his manager. The son may wish to speak with his mother, but only after his conversation has ended and he is in a better position to answer. The approaches described herein provide a seamless way for leveraging location awareness technology to determine proximity of individuals near an intended recipient of a communication and, through review and analysis of information via social networking outlets (e.g., Facebook®, LinkedIn®, etc.) and/or information on the recipient's communication device, determine whether the intended communication mode is to be allowed.

Figure 1:
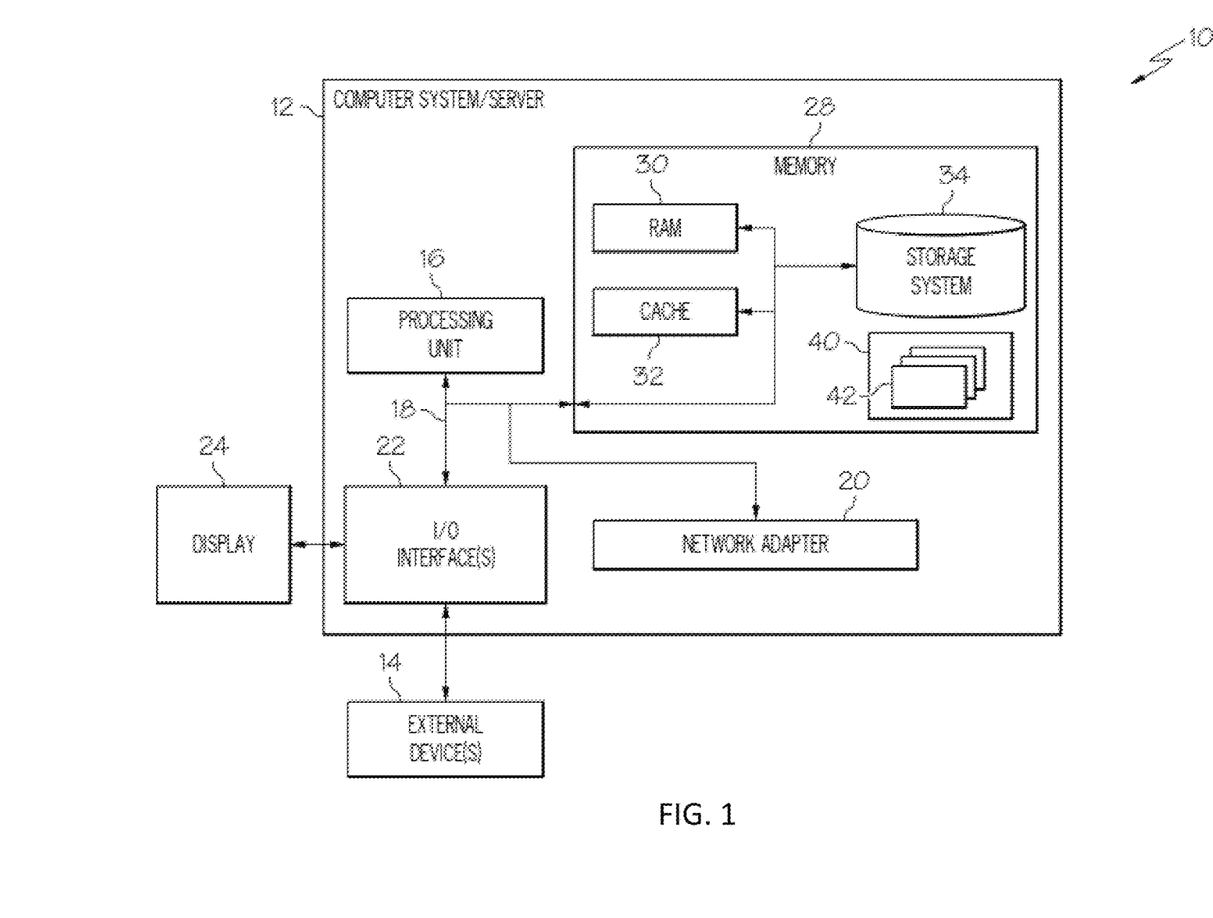
FIG. 1 shows an architecture 10 in which the invention may be implemented according to illustrative embodiments.

Referring now to FIG. 1, a computerized implementation 10 of an embodiment for determining whether to allow a communication to a recipient using a communication device based on one or more classifications of nearby individuals will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for determining whether to allow a communication to a recipient using a communication device based on one or more classifications of nearby individuals. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire, Bluetooth, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for determining whether to allow a communication to a recipient using a communication device based on one or more classifications of nearby individuals, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
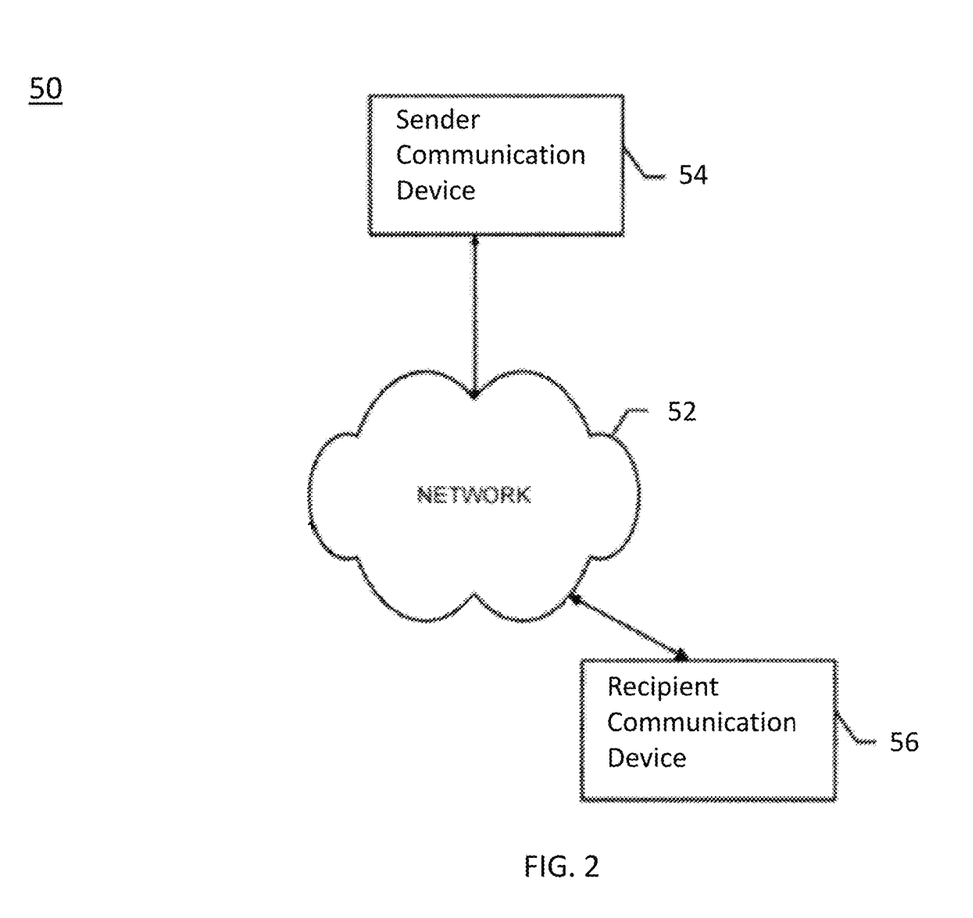
FIG. 2 shows a generic system diagram 50 in which a communication device receiving a communication is shown in an exemplary communication environment according to illustrative embodiments.

FIG. 2 illustrates a generic system diagram 50 in which sender communication device 54 initiates a call/communication message to recipient communication device 56 in an exemplary communication environment. As shown in FIG. 2, an embodiment of a system in accordance with an example embodiment may include wireline or wireless communication techniques, including Local Area Network (LAN), Wireless LAN (WLAN), Worldwide Interoperability for Microwave Access (WiMAX), Wireless Fidelity (WiFi), Ultra-Wide Band (UWB), Wibree techniques, or the like.

As such, sender communication device 54 and recipient communication device 56 may be enabled to communicate with network 52 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS), and/or the like, may be supported, as well as wireless access mechanisms such as WLAN, WiMAX, and/or the like, and fixed access mechanisms such as Digital Subscriber Line (DSL), cable modems, Ethernet, and/or the like.

In example embodiments, sender communication device 54 (and recipient communication device 56) may include, but is not limited to, a smart phone, a cellular phone, a Voice over Internet Protocol (VoIP) phone, a personal data assistant (PDA), a landline phone, a tablet, or any other communication device capable of establishing a phone call and/or communication message session over network 52. In an exemplary embodiment, sender communication device 54 may employ a computer system (e.g., computer system 12 of FIG. 1) capable of employing embodiments of the invention.

Figure 3:
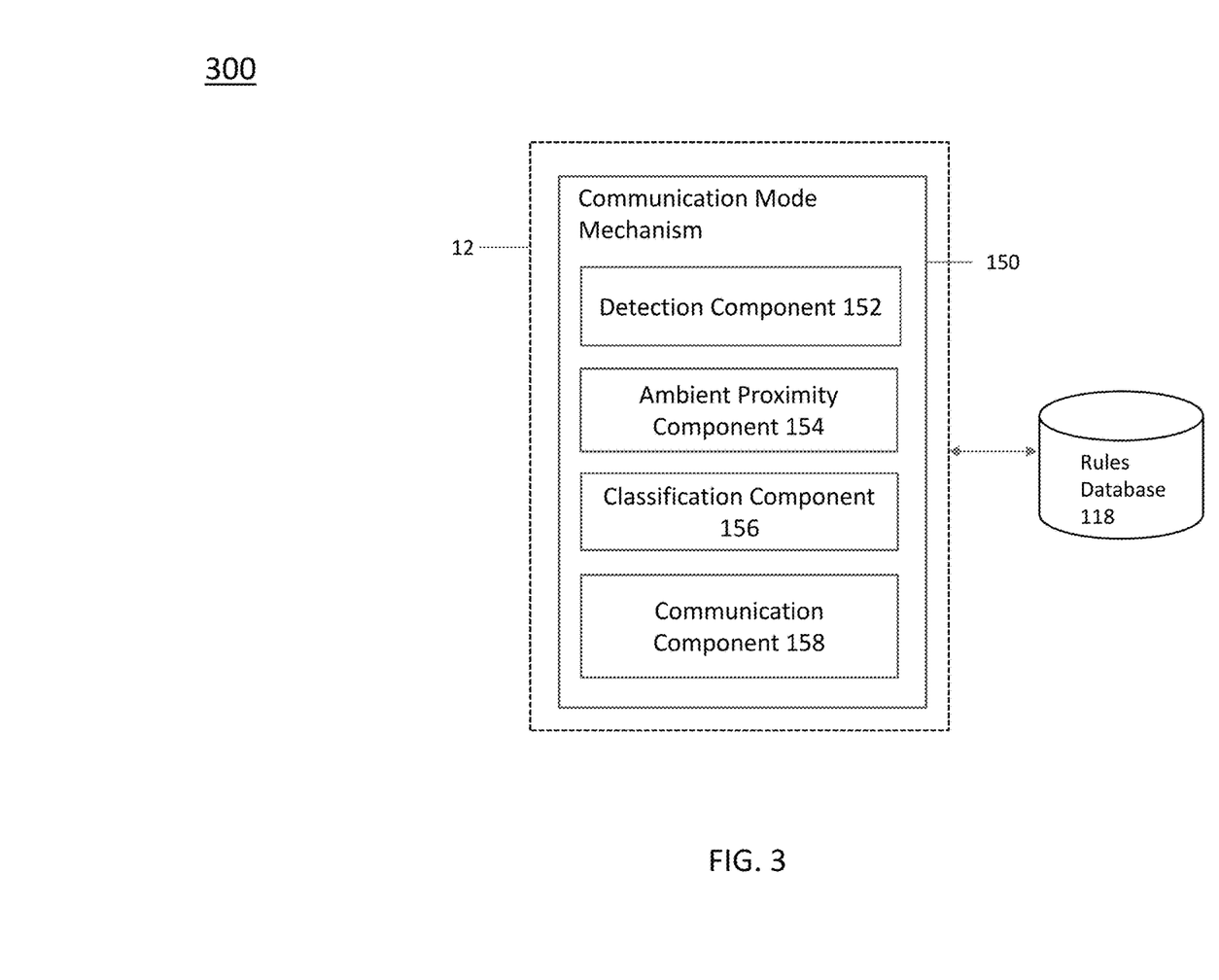
FIG. 3 shows a block diagram illustrating a communication mode mechanism 150 according to illustrative embodiments.

Referring now to FIG. 3, communication mode mechanism 150 for determining whether to allow a communication to a recipient using a communication device based on one or more classifications of nearby individuals is shown. In an exemplary embodiment, recipient communication device 56 may employ a communication mode mechanism (hereinafter "system 150"). In an embodiment, the present invention assumes and requires an intended recipient of a communication to be in proximity to recipient communication device 56. As depicted, system 150 is shown within computer system/server 12. In general, system 150 can be implemented as program/utility 40 on computer system 12 of FIG. 1 and can enable the functions recited herein. It is further understood that system 150 may be incorporated within or work in conjunction with any type of system that receives, processes, and/or executes commands with respect to IT resources in a networked computing environment. Such other system(s) have not been shown in FIG. 3 for brevity purposes.

Detection component 152 of system 150, as executed by computer system/server 12, is configured to detect an incoming communication via a first communication mode to a recipient communication device (e.g., recipient communication device 56). As referred to herein, the communication mode may include, but is not limited to, a phone call (e.g., audio or voice data communication), video call (e.g., video and audio data communication), or communication message. A communication mode is the medium or channel through which a communication is expressed and may include, but is not limited to, a voice message, short message service (SMS) message (e.g., text message), email message, multimedia messaging service (MMS) message (e.g., video message), instant message (e.g., chat message), social network message, or the like.

Ambient proximity component 154 of system 150, as executed by computer system/server 12, is configured to identify one or more individuals in proximity to recipient communication device 56 using known ambient proximity technology, such as SocialRadar. Using ambient proximity technology in real time, publicly available information about the individuals in proximity to the recipient can be gathered by connecting to each individual's Twitter®, Facebook®, LinkedIn®, Foursquare®, Instagram® and Google+® accounts to pull in data about their whereabouts, recent activities, and connections. In addition, ambient proximity technology can determine which of their contacts or connections are close by, how they know each other, and what those connections have been doing. The gathered data can be analyzed to identify one or more of the individuals near the intended recipient. Returning to the earlier mother/son example, ambient proximity component 154 may, using ambient proximity techniques, identify two individuals (e.g., Tom and Jerry) in proximity to the intended recipient (i.e., the son) based on the information gathered after detection component 152 detects an incoming phone call from the intended recipient's mother.

Classification component 156 of system 150, as executed by computer system/server 12, is configured to assign a classification to each of the identified individuals based on a determined relationship (e.g., friend, family, company manager, company officer, religious official, public official, etc.) to the intended recipient. To that end, the data gathered regarding the identified individuals and information retrieved from recipient communication device 56 can be analyzed to determine a relationship to the intended recipient and classify each identified individual based on the relationship.

Returning to the earlier mother/son example, classification component 156 attempts to classify each of the identified individuals based on a relationship to the intended recipient. To that end, classification component 156 analyzes data gathered from various social media outlets related to Tom and Jerry to establish a relationship for each to the intended recipient. For example, Tom's Facebook® activity is mined to determine Tom is a "friend" of the intended recipient and has tagged the intended recipient in several photos. Also, recipient communication device 56 is analyzed to determine many text messages and phone calls have been exchanged between Tom and the intended recipient on a consistent basis. Based on this analysis, Tom is classified as a friend to Joe.

In addition, classification component 156 analyzes Jerry's LinkedIn account and the intended recipient's LinkedIn account to determine the two work at the same place of business. However, Jerry's account indicates he is a company manager, while Joe is a programmer. Also, recipient communication device 56 is unable to locate any communications (e.g., phone calls, text messages, etc.) between Jerry and Joe based on analysis of recipient communication device 56. Furthermore, Jerry is not listed as one of Joe's Facebook® friends. Based on this analysis, Jerry is classified as a company manager and not a friend. The classifications listed are exemplary only and not intended to be limiting. Other classifications are possible.

In an embodiment, classification component 156 may classify an individual based on a confidence level in the accuracy of the gathered information. Confidence in the gathered information may depend upon the source of the data (e.g., whether it is user-specified or obtained from an exogenous source) or whether the data has been verified by a reliable source. For instance, the user profile of the user may indicate that the user is friends with John Smith. This information may indicate John Smith should be classified as a friend. However, John may not consider the user to be a friend at all. Without other indicia of confidence in the data, the usefulness of the information may be undermined, calling into question the classification of John as a friend. Therefore, classification component 156 may be configured to classify an individual only when a confidence level exceeds a predefined threshold. For example, to reach the threshold, a predefined number of separate sources must have been used in selecting a classification (e.g., multiple text messages and/or phone calls between the user and John, John has the user as a Facebook® friend, the user has John as a Facebook® friend, John referenced the user in several Twitter® messages, etc.). The predefined number of sources may be system-defined and/or user-defined and stored in a database (not shown).

Figure 4:
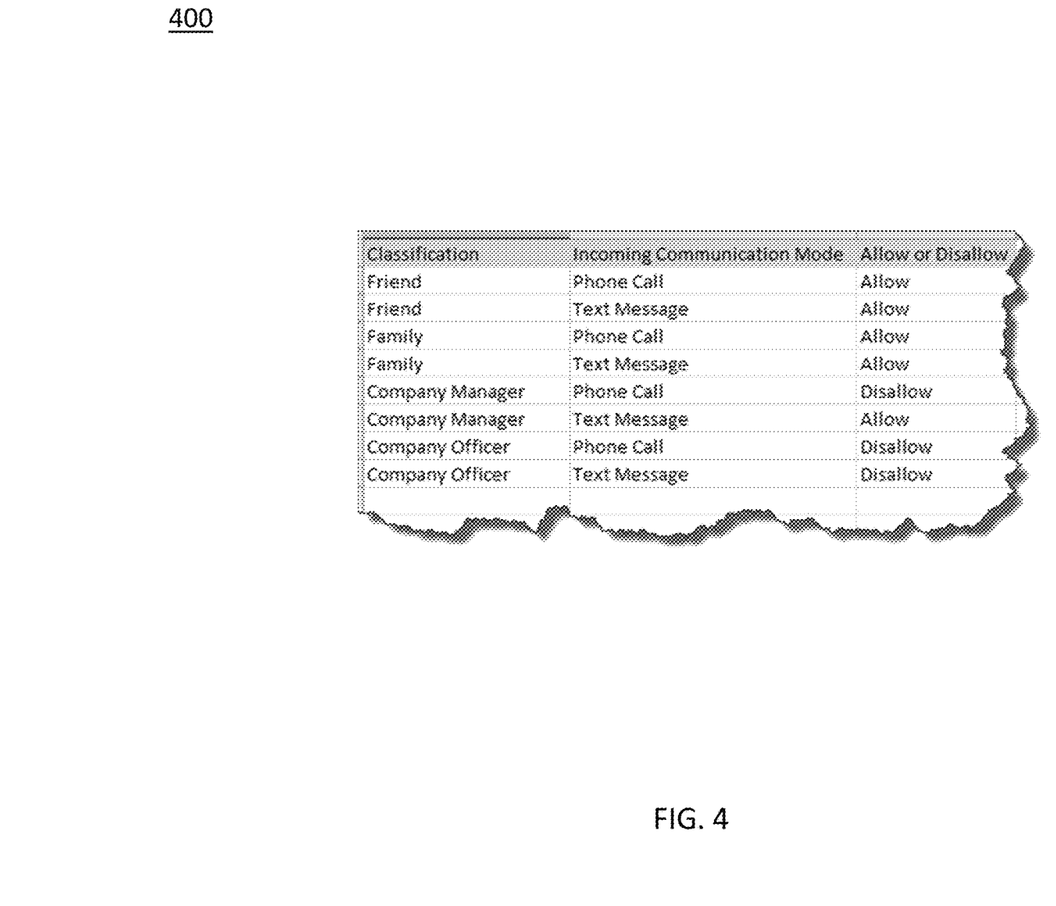
FIG. 4 shows an example data structure 400 for implementing rules database 118 according to illustrative embodiments.

Communication component 158 of system 150, as executed by computer system/server 12, is configured to determine whether to allow a communication to a recipient using a communication device based on one or more classifications of nearby individuals. Rules for classification and communication mode selection may be stored rules database 118 coupled to system/server 12. FIG. 4 shows an example data structure 400 for implementing document index database 117. Data structure 400 includes a classification, incoming communication mode, and whether to allow or disallow the incoming communication mode for the respective classification.

Based on the earlier example, a caller initiates a phone call to recipient using recipient communication device 56. Detection component 152 of recipient communication device 56 detects the incoming phone call. Ambient proximity component 154 identifies Tom and Jerry are nearby to the intended recipient. Classification component 156 classifies Tom as a friend and Jerry as a company officer. Communication component 158 retrieves rules data from rules database 118 to determine whether to allow the incoming phone call. To that end, rules database 118 indicates that, due to Jerry's classification as a company manager, transmission of the incoming call is canceled because the communication mode is not appropriate at this time. In an embodiment, incoming phone calls that are not allowed can be immediately sent (i.e., recipient communication device 56 does not ring) to a recipient's voice mail if properly configured.

In an embodiment, communication component 158 is further configured to transmit a notification to the sender/caller that the communication was canceled. In addition, the notification may include one or more recommended communication modes based on the rules defined in rules database 118. Using the Tom/Jerry example, the caller may be notified that the phone call has been canceled but the recipient is able to receive text messages at this time. In addition, the notification may provide the name(s) and/or classification(s) of those nearby which necessitated the cancellation.

In an embodiment, communication component 158 may recommend to the caller/sender a more appropriate time to contact the recipient based on information gathered from social media outlets or recipient communication device 56. For example, the recipient's calendar on recipient communication device 56 indicates he is in a meeting for the next 30 minutes with Tom and Jerry. Therefore, a notification to the caller/sender may recommend that the caller/sender wait at least 30 minutes for the meeting to end before attempting to reach the recipient via a phone call.

In another embodiment, communication component 158 may temporarily alter settings on recipient communication device 56 based on the rules defined in rules database 118. For example, a user may not wish to continue receiving text messages when meeting with a company officer. To that end, communication component 158 may alter the settings (e.g., turning on a 'Do Not Disturb' mode) in recipient communication device 56 so no text messages are received until the company officer is no longer nearby.

Figure 5:
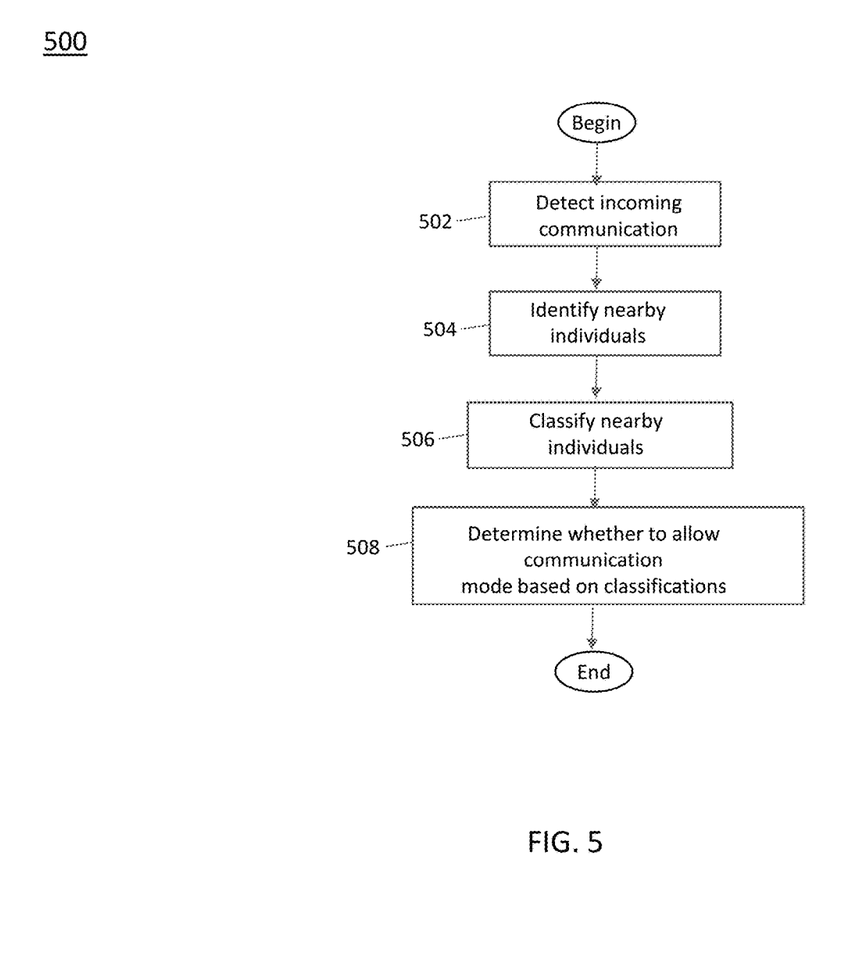
FIG. 5 shows a process flowchart 500 for determining whether to allow a communication to a recipient using a communication device based on one or more classifications of nearby individuals according to illustrative embodiments.

Referring now to FIG. 5, in conjunction with FIGS. 1-4, an implementation of a process flowchart 500 for determining whether to allow a communication to a recipient using a communication device based on one or more classifications of nearby individuals is shown. At step 502, detection component 152 detects an incoming communication to recipient communication device 56. At step 504, ambient proximity component 154 identifies one or more individuals nearby the recipient. At step 506, classification component 156 attempts to classify each of the individuals based on information gathered from various social media outlets and recipient communication device 56. At step 508, communication component 158 determines whether to allow the communication based on the classifications.

Process flowchart 500 of FIG. 5 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for determining whether to allow a communication to a recipient using a communication device based on one or more classifications of nearby individuals. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for determining whether to allow a communication to a recipient using a communication device based on one or more classifications of nearby individuals. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches to determining whether to allow a communication to a recipient using a communication device based on one or more classifications of nearby individuals. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for proximity-based communication, comprising:
    detecting an incoming communication via a first mode of communication from a caller/sender at a communication device of an intended recipient at a first time;
    identifying, in response to the detecting of the incoming communication and prior to determining whether to allow transmission to the intended recipient, one or more individuals in proximity to the communication device of the intended recipient using ambient proximity technology;
    retrieving, in response to the detecting of the incoming communication, information for each individual of the one or more individuals from a social network profile of the individual using the ambient proximity technology;
    assigning a classification to each of the one or more individuals based on the retrieved information;
    determining, based on the classification of each of the one or more individuals previously determined to be in proximity, whether to allow transmission of the first mode of communication to the intended recipient;
    responsive to determining that the first mode of communication is not allowed, canceling transmission of the communication, such that communications are re-allowed when the one or more individuals is no longer in proximity; and
    responsive to determining that the first mode of communication is allowed, allowing transmission of the communication to the intended recipient.

2. The computer-implemented method of claim 1, further comprising transmitting a notification to the caller/sender regarding the canceled transmission.

3. The computer-implemented method of claim 2, wherein the notification includes a recommendation related to at least one of a second time or a second mode of communication for the communication.

4. The computer-implemented method of claim 1, further comprising:
    determining a confidence level for an identification of an individual among the one or more individuals;
    determining whether the confidence level exceeds a predefined threshold; and
    responsive to determining the confidence level exceeds the predefined threshold, assigning a classification to the individual, wherein the one or more individuals in proximity to the communication device of the intended recipient are identified via ambient proximity technology.

5. The computer-implemented method of claim 1, wherein the first mode of communication is selected from a group consisting of: a voice call, a text message, an email, a message via an instant messaging service, and a social network message.

6. The computer-implemented method of claim 1, wherein assigning the classification for each of the one or more individuals further comprises:
    retrieving information for each individual of the one or more individuals from the communication device; and
    assigning each of the one or more individuals to the classification based additionally on the retrieved information from the communication device, wherein the classification specifies a type of relationship between each of the one or more individuals and the intended recipient that includes a selection between a first specified relationship and a second specified relationship.

7. A computer system for proximity-based communication, the computer system comprising:
    a memory medium comprising program instructions;
    a bus coupled to the memory medium; and
    a processor for executing the program instructions, the instructions causing the system to:
        detect an incoming communication via a first mode of communication from a caller/sender at a communication device of an intended recipient at a first time;
        identify, in response to the detecting of the incoming communication and prior to determining whether to allow transmission to the intended recipient, one or more individuals in proximity to the communication device of the intended recipient using ambient proximity technology;
        retrieve, in response to the detecting of the incoming communication, information for each individual of the one or more individuals from a social network profile of the individual using the ambient proximity technology;
        assign a classification to each of the one or more individuals based on the retrieved information;
        determine, based on the classification of each of the one or more individuals previously determined to be in proximity, whether to allow transmission of the first mode of communication to the intended recipient; and
        cancel transmission of the communication when the first mode of communication is not allowed, such that communications are re-allowed when the one or more individuals is no longer in proximity; and
        allow transmission of the communication to the intended recipient when the first mode of communication is determined to be allowed.

8. The computer system of claim 7, further comprising program instructions to transmit a notification to the caller/sender regarding the canceled transmission.

9. The computer system of claim 8, wherein the notification includes a recommendation related to at least one of a second time or a second mode of communication for the communication.

10. The computer system of claim 7, further comprising computer instructions to:
    determine a confidence level for an identification of an individual among the one or more individuals;
    determine whether the confidence level exceeds a predefined threshold; and
    assign a classification to the individual when the confidence level exceeds the predefined threshold, wherein the one or more individuals in proximity to the communication device of the intended recipient are identified via ambient proximity technology.

11. The computer system of claim 7, wherein the first mode of communication is selected from a group consisting of: a voice call, a text message, an email, a message via an instant messaging service, and a social network message.

12. The computer system of claim 7, further comprising computer instructions to:
retrieve information for each of the one or more individuals from the communication device; and
assign each of the one or more individuals to the classification based additionally on the retrieved information from the communication device, wherein the classification specifies a type of relationship between each of the one or more individuals and the intended recipient that includes a selection between a first specified relationship and a second specified relationship.

13. A computer program product for proximity-based communication, and program instructions stored on the computer readable storage device, to:
detect an incoming communication via a first mode of communication from a caller/sender at a communication device of an intended recipient at a first time;
identify, in response to the detecting of the incoming communication and prior to determining whether to allow transmission to the intended recipient, one or more individuals in proximity to the communication device of the intended recipient using ambient proximity technology;
retrieve, in response to the detecting of the incoming communication, information for each individual of the one or more individuals from a social network profile of the individual using the ambient proximity technology;
assign a classification to each of the one or more individuals based on the retrieved information;
determine, based on the classification of each of the one or more individuals previously determined to be in proximity, whether to allow transmission of the first mode of communication to the intended recipient; and
cancel transmission of the communication when the first mode of communication is not allowed, such that communications are re-allowed when the one or more individuals is no longer in proximity; and
allow transmission of the communication to the intended recipient when the first mode of communication is determined to be allowed.

14. The computer program product of claim 13, further comprising program instructions to transmit a notification to the caller/sender regarding the canceled transmission.

15. The computer program product of claim 14, wherein the notification includes a recommendation related to at least one of a second time or a second mode of communication for the communication.

16. The computer program product of claim 13, further comprising computer instructions to:
determine a confidence level for an identification of an individual among the one or more individuals;
determine whether the confidence level exceeds a predefined threshold; and
assign a classification to the individual when the confidence level exceeds the predefined threshold, wherein the one or more individuals in proximity to the communication device of the intended recipient are identified via ambient proximity technology.

17. The computer program product of claim 13, wherein the first mode of communication is selected from a group consisting of: a voice call, a text message, an email, a message via an instant messaging service, and a social network message.

18. The computer program product of claim 13, further comprising computer instructions to:
retrieve information for each of the one or more individuals from the communication device; and
assign each of the one or more individuals to the classification based additionally on the retrieved information from the communication device, wherein the classification specifies a type of relationship between each of the one or more individuals and the intended recipient that includes a selection between a first specified relationship and a second specified relationship.

* * * * *